April 2, 1957     C. G. B. HAMMAR     2,787,598
PROCESS FOR THE REGENERATION OF A CATALYST ACCELERATING
THE BINDING OF OXYGEN TO HYDROGEN
Filed Nov. 24, 1952
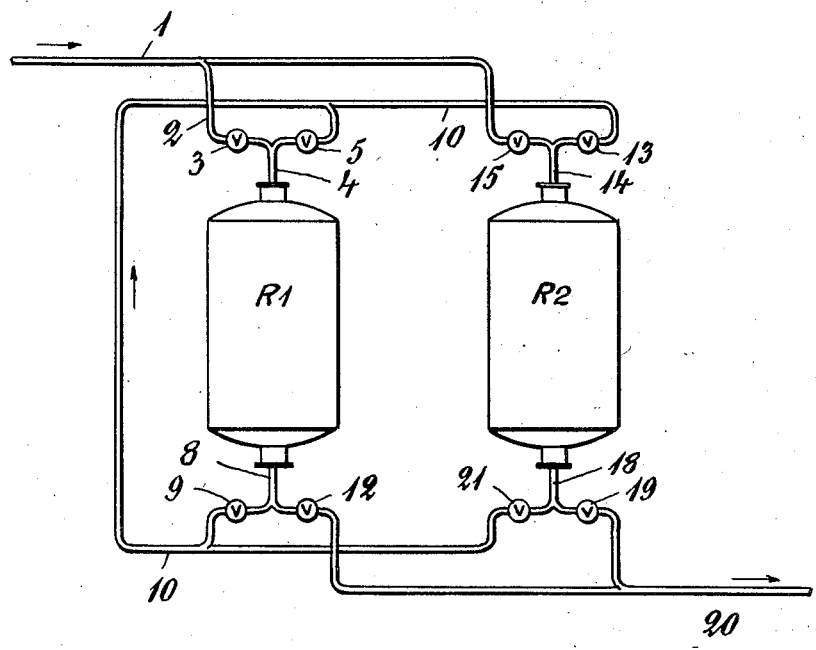
Inventor
Carl Gustaf Bertil Hammar,
By Pierce, Scheffler & Parker
his Attorneys

United States Patent Office 2,787,598
Patented Apr. 2, 1957

2,787,598

PROCESS FOR THE REGENERATION OF A CATALYST ACCELERATING THE BINDING OF OXYGEN TO HYDROGEN

Carl Gustaf Bertil Hammar, Kumla, Sweden, assignor to Svenska Skifferolje Aktiebolaget, Orebro, Sweden, a company of Sweden Application November 24, 1952, Serial No. 322,209

Claims priority, application Sweden November 12, 1952

7 Claims. (Cl. 252—411)

The present invention relates to the removal of free oxygen in a catalytical way from gases containing free hydrogen and, in addition, hydrogen sulphide, even in high concentration. Such gases are obtained i. e. in the dry distillation of, for instance, certain shales. In such distillation gases rich in hydrocarbons are obtained which contain, in addition to hydrogen and hydrogen sulphide, usually also other sulphur compounds, particularly mercaptans and carbonyl sulphide. It has been established that the binding of oxygen to hydrogen is highly accelerated by a catalyst mass comprising a first catalyst component containing at least one of the metals molybdenum and tungsten in the form of sulphide and/or oxide, a second catalyst component containing at least one of the metals iron, cobalt, nickel, chromium, vanadium, and uranium in the form of sulphide and/or oxide, and a carrier component based on alumina, silica gel, synthetic or natural aluminium silicate or mixtures thereof, the major portion of the catalyst mass consisting of the carrier component and the amounts of said first catalyst component and said second catalyst component being of the same order. The atomic ratio between the metals in the first catalyst and second catalyst components and the positive element of the carrier component should preferably be within the limits 0.5–1.5:0.5–1.5:10. A catalyst mass of this kind is more particularly described in my copending application Serial No. 257,785, filed November 23, 1951. It has been found that this catalyst mass sometimes becomes highly polluted by sulphur separated out from the gas due to the fact that the catalyst also catalyzes the combustion of hydrogen sulphide to water and free sulphur. This drawback has appeared to take place particularly at high oxygen percentages.

A thorough investigation of the mechanism and kinetic of the reactions expected to take place in the system $H_2+H_2S+O_2$ at the catalytic removal of oxygen has disclosed that the following reactions and reaction velocities are to be reckoned with:

$$2H_2+O_2 \rightarrow 2H_2O \quad (1)$$

$$2H_2S+O_2 \rightarrow 2H_2O+2S \quad (2)$$

$$S_{\text{solid or liquid}} \rightarrow S_{\text{vapour}} \quad (3)$$

$$H_2+S \rightarrow H_2S \quad (4)$$

Here S is a symbol for the total amount of sulphur without specifying the distribution between $S_2$, $S_6$, and $S_8$ molecules that actually exists. The reaction kinetic investigation has shown that the reactions 1, 3, and 4 take place with velocities that are independent of the concentrations of oxygen or sulphur, respectively, while the velocity of the reaction 2 is direct proportional to the oxygen concentration. At low concentration sulphur that may have been deposited will therefore be removed from the catalyst as it is formed and a state of equilibrium is arrived at so that the amount of sulphur remains constant. If the oxygen concentration is increased, the formation of sulphur according to reaction 2 is increased, while the sulphur consumption according to reactions 3 and 4 remains constant. The result is that over a given oxygen concentration the total amount of sulphur on the catalyst increases perpetually so that the pores of the catalyst will ultimately be completely filled with sulphur leading to a successive lowering of the activity.

On the basis of the investigations made it has been possible to establish that for each catalyst accelerating the binding of oxygen with hydrogen in the system of $H_2+H_2S+O_2$, in any case when the concentration of $H_2S$ is equal to or higher than the concentration of $O_2$, the rule applies for each temperature that sulphur separates out only over a given oxygen concentration which is here called the critical concentration of oxygen. This is thus a material constant which is definite for each catalyst, at least at normal composition and speed of the gas. For a catalyst mass of the above type and having the following more precise composition:

$$Co_2O_3 \cdot 2MoO_3 \cdot 5Al_2O_3$$

of the atomic ratio Co:Mo:Al=1:1:10 the critical concentration in percentage of volume has been found to be about 0.5 at 150° C., about 1.25 at 220° C., and about 1.5 at 350° C. by using available methods of measuring.

It has been found that when the oxygen concentration is lower than the critical concentration the length of life of the catalyst is very long and is only limited by a slight carbon deposit when shale distillation gases have been treated, while the activity of the catalyst decreases rapidly at oxygen percentages over the critical concentration as a consequence of the deposition of sulphur.

It has also been found that there is an optimum temperature. At essentially lower temperatures the critical concentration of oxygen is too low and at elevated temperatures side-reactions set in more and more which reactions consume hydrogen as well as badly affect the catalyst.

The present invention relates to a process for the regeneration of a catalyst accelerating the binding of oxygen to hydrogen and used for removing free oxygen from a raw-gas containing free hydrogen and hydrogen sulphide as well as oxygen in a concentration over the critical concentration of oxygen pertinent to the catalyst and polluted by deposited sulphur. The invention is characterized in the fact that the polluted catalyst is contacted with a regenerating gas containing hydrogen and hydrogen sulphide, the oxygen percentage of which is, however, essentially below the critical concentration and, for instance, is free from free oxygen. Gas freed from free oxygen by means of the catalyst is preferably used but also other gases poor in or free from oxygen may be used. The temperature for the regeneration is with advantage 200–350° C. or slightly more. A preferred mode of carrying out the invention is to sub-divide the catalyst mass at the catalytical removal of oxygen into two parts and pass the gas in series through these parts and reverse the order of the parts after the one part has been polluted by deposited sulphur, whereby the polluted part is regenerated by the gas having passed the other part. Alternatively, the regenerating gas may be passed through the bed until a sufficiently thick layer thereof has been regenerated for the oxygen concentration of a raw-gas passed therethrough to become essentially lower than the critical concentration, whereupon raw-gas is passed through the bed instead of regenerating gas.

The invention is based upon the fact that the activity of the catalyst for reaction 4 is not totally lost even when the sulphur formation according to reaction 2 has proceeded very far. This means that if a catalyst mass inactivated by sulphur formation is treated with a hydrogen-containing gas of low oxygen concentration sulphur is first removed by evaporation and by and by at increasing velocity according to reaction 4 until the catalyst becomes completely regenerated. This regeneration may take place at the same temperature as removal of oxygen but may also take place at considerably higher temperatures without detrimental by-reactions.

The invention will now be described in connection with an embodiment illustrated in the attached drawing, but it is to be understood that it is not limited thereto. The drawing illustrates two cooperating reactors.

The raw-gas is preheated in equipments not shown and is passed through conduit 1 alternatingly to reactor R1 or R2. It is presumed that reactor R1 is active while reactor R2 has been inactivated by sulphur formation. The preheated raw-gas is passed to reactor R1 from conduit 1 through a branch conduit 2 and the valve 3 and further through inlet 4, valve 5 being then closed. In this reactor complete removal of oxygen takes place and the oxygen-free product gas leaves R1 through the outlet 8 and the valve 9 so as to be introduced into conduit 10. At this occasion valve 12 is closed. From conduit 10 the gas is introduced at the top of reactor R2 through valve 13 and inlet 14, valve 15 connected to the raw-gas conduit 1 being closed. In reactor R2 the sulphur is now removed by the oxygen-free gas according to the reactions 3 and 4. The removal of sulphur is facilitated by the fact that the temperature in reactor R2 is higher than the average temperature in reactor R1 due to the exothermic reaction in the latter. The product gas leaves reactor R2 through outlet 18 and valve 19 and enters the product gas conduit 20, the valve 21 to conduit 10 being then closed. In conduit 20 coolers or the like may be inserted which is not illustrated in the drawing. The catalyst in reactor R1 is successively inactivated by deposited sulphur, which can be ascertained by analysing the gas from this reactor but also through measuring the temperature at different levels of the catalyst mass. This is due to the fact that the highly exothermic reactions 1 and 2 to a great extent take place in a relatively small portion of the catalyst mass and the position of this portion can easily be followed as a hot zone moving downwardly through the mass. When the mass in reactor R1 is almost consumed reversal is performed so that the gas from conduit 1 is first passed to reactor R2 for removal of oxygen and from there is then passed to reactor R1 for regeneration of the catalyst therein. This is carried out by closing valves 3, 9, 13, and 19 and opening the valves 5, 12, 21, and 15.

In this example it has been presumed that single one-step-reactors are to be used but the invention may be applied to systems including multiple-step-reactors where the raw-gas is supplied in parallel to the various steps and is diluted by return gas or some other gas poor in oxygen, as according to my copending patent application No. 322,208.

In such manner the catalyst may be reactivated a large number of times until formation of coke and polymerisate permanently reduces the activity to such an extent that regeneration through clean burning by air and reduction will be necessary, for instance, in the manner disclosed in my copending application Serial No. 257,785, filed November 23, 1951.

The carrier component of the catalyst mass may be made of alumina, silica gel, synthetic or natural aluminium silicate, and magnesium oxide or a mixture of one or more thereof.

What is claimed is:

1. Process for removing free oxygen from a raw-gas containing free hydrogen, hydrogen sulphide in substantial amount and free oxygen, by means of a sulphidic catalyst which accelerates the reaction between oxygen and hydrogen to form water, the concentration of oxygen being so high as to cause at a reaction temperature between 150° and 350° C. an amount of elemental sulphur to be formed per unit of time by the oxidation of hydrogen sulphide with oxygen in excess of the amount of elemental sulphur simultaneously removed by evaporation and by reduction with hydrogen, which comprises the sequence of steps consisting of (1) continuing the passage through a mass of said sulphidic catalyst of quantities of said raw-gas initially containing free oxygen in a concentration so high as to cause formation and deposition of free elemental sulphur until the catalyst has become polluted with deposited free elemental sulphur, then (2) passing through the resulting mass of sulphur-polluted catalyst a regenerating gas containing free hydrogen, hydrogen sulphide and free oxygen in a concentration so low as not to cause such a formation and deposition of free elemental sulphur, in an amount to regenerate the catalyst mass, and then repeating step 1.

2. The process defined in claim 1, in which the catalyst mass comprises a first catalyst component selected from the group consisting of sulphides and oxides of the metals molybdenum and tungsten, a second catalyst component selected from the group consisting of sulphides and oxides of the metals iron, cobalt, nickel, chromium, vanadium and uranium and a carrier component selected from the group consisting of alumina, silica gel, synthetic aluminum silicates, natural aluminum silicates and mixtures thereof, the major portion of the catalyst mass consisting of the carrier component, and the amounts of the first catalyst component and the second catalyst component being of the same order.

3. A process as claimed in claim 1 in which said regenerating gas is passed through said catalyst mass at a temperature of from about 200° to about 350° C.

4. A process for the removal of free oxygen from a raw-gas containing free hydrogen, hydrogen sulphide and free oxygen comprising establishing at least two separate bodies of a mass of a catalyst which accelerates the binding of oxygen to hydrogen and at a critical concentration of oxygen causes at a reaction temperature between 150° C. and 350° C. an amount of sulphur to be formed per unit of time by the oxidation of hydrogen sulphide with oxygen just in excess of the amount of sulphur simultaneously removed by evaporation and by reduction with hydrogen, passing in one serial direction through one of said bodies quantities of such raw-gas initially containing oxygen in a concentration over the critical concentration pertaining to said catalyst until the catalyst of the body has become polluted by deposited free sulphur, then passing further quantities of said raw-gas through another of said bodies not polluted by free sulphur and passing the gas from said non-polluted body through said polluted body until the latter has been regenerated.

5. A process for the removal of free oxygen from a raw-gas containing free hydrogen, hydrogen sulphide and free oxygen, comprising establishing two separate bodies of a mass of a catalyst which accelerates the binding of oxygen to hydrogen and at a critical concentration of oxygen causes at a reaction temperature between 150° C. and 350° C. an amount of sulphur to be formed per unit of time by the oxidation of hydrogen sulphide with oxygen just in excess of the amount of sulphur simultaneously removed by evaporation and by reduction with hydrogen, passing in one serial direction through said bodies quantities of such raw-gas initially containing oxygen in a concentration over the critical concentration pertaining to said catalyst until the catalyst of the body which the raw-gas first enters has become polluted by deposited free sulphur, and then passing further quantities of said raw-gas in opposite serial direction through said bodies until said deposited sulphur has been substantially removed and the catalyst of the body which the raw-gas now first enters will become polluted by deposited sulphur, and repeating the procedure for any desired number of reversals.

6. A process as claimed in claim 1 in which said regenerating gas is passed through said mass only until so thick a layer thereof at the entrance of the regenerating gas has become substantially free from said deposited sulphur as will be sufficient for reducing the concentration of oxygen of raw-gas passed through said layer to a value essentially below said critical concentration, and then passing raw-gas through said mass in the same direction as the regenerating gas was passed therethrough.

7. A process as claimed in claim 2, in which the atomic ratio between the metals in the catalyst and promoter components and the positive element of the carrier component are within the limits 0.5–1.5 : 0.5–1.5 : 10.

References Cited in the file of this patent

UNITED STATES PATENTS

| | | |
|---|---|---|
| 2,024,393 | Sexauer | Dec. 17, 1935 |
| 2,193,278 | Griffith et al. | Mar. 12, 1940 |
| 2,409,690 | Nicholson et al. | Oct. 22, 1946 |
| 2,697,078 | Hendel | Dec. 14, 1954 |

FOREIGN PATENTS

| | | |
|---|---|---|
| 587,070 | Great Britain | Apr. 14, 1947 |